US006487407B2

United States Patent
Goldberg et al.

(10) Patent No.: US 6,487,407 B2
(45) Date of Patent: Nov. 26, 2002

(54) REGISTER FOR AND METHOD OF PROVIDING CONTACT INFORMATION FOR A COMMUNICATIONS UNIT IDENTIFIED BY A UNIFORM RESOURCE NAME

(75) Inventors: Steven J. Goldberg, Fort Worth; W. Garland Philips, Arlington, both of TX (US); Janiece S. Webb, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 27 days.

(21) Appl. No.: 09/822,656

(22) Filed: Mar. 30, 2001

(65) Prior Publication Data

US 2002/0142770 A1 Oct. 3, 2002

(51) Int. Cl.⁷ .............................. H04Q 7/20; G06F 15/16
(52) U.S. Cl. ...................... 455/433; 709/227; 709/219
(58) Field of Search ................................ 455/433, 432, 455/435, 426, 456, 414; 709/219, 225, 227; 370/349

(56) References Cited

U.S. PATENT DOCUMENTS

| 5,901,352 A | * | 5/1999 | St-Pierre et al. ............ 455/433 |
| 6,075,783 A | * | 6/2000 | Voit ............................ 370/352 |
| 6,185,204 B1 | * | 2/2001 | Voit ............................ 370/352 |
| 6,201,965 B1 | * | 3/2001 | Mizell et al. ................ 455/433 |
| 6,269,244 B1 | * | 7/2001 | Alperovich et al. ......... 455/433 |
| 2001/0044309 A1 | * | 11/2001 | Bar et al. .................... 455/433 |
| 2001/0049746 A1 | * | 12/2001 | Shin ........................... 709/239 |
| 2002/0016174 A1 | * | 2/2002 | Gibson et al. .............. 455/464 |
| 2002/0052912 A1 | * | 5/2002 | Griswold et al. ........... 709/223 |
| 2002/0077085 A1 | * | 6/2002 | Kalish et al. ................ 455/414 |

* cited by examiner

*Primary Examiner*—Lee Nguyen
*Assistant Examiner*—Rafael Perez-Gutierrez
(74) *Attorney, Agent, or Firm*—Charles W. Bethards; Hisashi D. Watanabe

(57) ABSTRACT

A method of and register for obtaining information required to contact a communications unit is disclosed. The method includes: accessing a accessor location register, containing uniform resource names (URNs) cross referenced to uniform resource locators (URLs), to determine whether a URL corresponding to a URN for the communication unit is available; when the URL is available; initiating, using the URL, a first contact attempt with the communications unit; and contacting, using the URN, a home location register to validate the URL; and when the URL is not available; contacting, using the URN, the home location register to obtain the URL and then, using the URL, initiating a second contact attempt with the communications unit.

20 Claims, 5 Drawing Sheets

REGISTER FOR AND METHOD OF PROVIDING CONTACT INFORMATION FOR A COMMUNICATIONS UNIT IDENTIFIED BY A UNIFORM RESOURCE NAME

FIELD OF THE INVENTION

The present invention relates to communications systems that provide service to communications units over a plurality of coverage areas and more specifically to providing contact information for such a unit identified by a uniform resource name (URN).

BACKGROUND OF THE INVENTION

Communications systems that provide service to communications units over a plurality of coverage areas are known. Such systems include various Wide Area Networks such as present and planned cellular or wireless phone and data systems. Current versions of such systems include cellular phones or communications devices that have a phone number and normally have an associated home coverage area or area that the device or unit normally operates within known as the home area. Particulars regarding the device, billing information, and services available are found within the memory or database known as a home location register (HLR). When the device roams out of the home area and into another area it will register with that visited system. The visited system will contact the home system or HLR and obtain the appropriate information which is then retained in a local visiting location register (VLR).

When the unit comes within the home coverage area and is activated or powered on, it registers with the system and the unit phone number or other information is recognized and services provided according to the information within the home location register. When the unit is activated in the visited coverage area and registers with that system it normally will be recognized as a visitor to the system. The device particulars such as phone number are sufficient for the visited system to contact the proper HLR to obtain the billing information and services information which will be stored within the VLR associated with or local to the visited system. The HLR when contacted will be updated to include information that points to the VLR. When the unit originates a call the appropriate information will be available to provide correct services and collect and forward to the HLR proper billing information.

A second unit wishing to contact the unit will contact the HLR, if registered with the same home area, and be forwarded to the VLR. If registered with a different home area, the second unit will contact its local VLR and if no information related to the unit is found, it will be directed to the HLR and thus to the VLR. Thus second units registered with the visited system will be able to contact the unit directly while all others will have to go through the HLR suffering the inherent latency that entails. When the unit roams out of the visited system and registers with another system a new VLR will contact the HLR and the HLR will forward information resulting in the other VLR de-registering the unit and the HLR being updated to point to the new VLR. In essence there can only be one HLR and one VLR and any communications units that are not within the same coverage area as the unit they wish to contact will suffer some additional latency in call setup while the proper contact information is being collected or determined or located.

Communications systems such as GPRS or those being planned use or may use internet protocol addressing such as IP version 6 or IPv6 where units will have a unique uniform resource indicator (URI) or more specifically a uniform resource name (URN), for example, of the form urn:wireless:800-555-1234. A URN is a subset of URIs normally used to provide a unique name having persistence as an identifier for an entity. The URN as the name suggests provides a unique designator for a unit or entity and should not be confused with a uniform resource locator (URL) that may take various forms. For example, a URL corresponding to the above URN may be of the form sip:+1-800-555-1234@wg.wireless-network.com, or if the URN corresponds to a URL for an IP address, the URL may be of the form sip:adam@10.1.2.3. A URL identifies a network location and a URL is again a subset of URIs. When a computer or unit or the like moves it will have a new URL but can retain the same URN. In these systems a problem of associating URNs and URLs will be with us much as the problem of associating phone numbers and locations is now with us.

What is needed is a method and apparatus for efficiently and effectively obtaining contact information and minimizing any session setup delays resulting therefrom.

BRIEF DESCRIPTION OF THE DRAWINGS

The accompanying figures, where like reference numerals refer to identical or functionally-similar elements throughout the separate views and which are incorporated in and form part of the specification, further illustrate various embodiments in accordance with the present invention. The figures together with the detailed description, hereinafter below, serve to explain various principles and advantages in accordance with the present invention.

DETAILED DESCRIPTION OF A PREFERRED EMBODIMENT

In overview form the present disclosure concerns communications systems that provide service to communications units operating therein. More particularly various inventive concepts and principles embodied in methods and apparatus for facilitating the determination of contact information for communications units identified with URNs are discussed. The communications systems of particular interest are those being deployed such as GPRS systems or those being planned that employ IPv6 such as $3^{rd}$ generation IP based systems or other systems using IP addressing and allowing for portability of the communications devices. As further discussed below various inventive principles and combinations thereof are advantageously employed to quickly obtain accurate contact information and thus rapidly facilitate setting up a sessions with or between communications units regardless of present locations thus facilitating roaming service to units operating on such systems provided these principles or equivalents are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
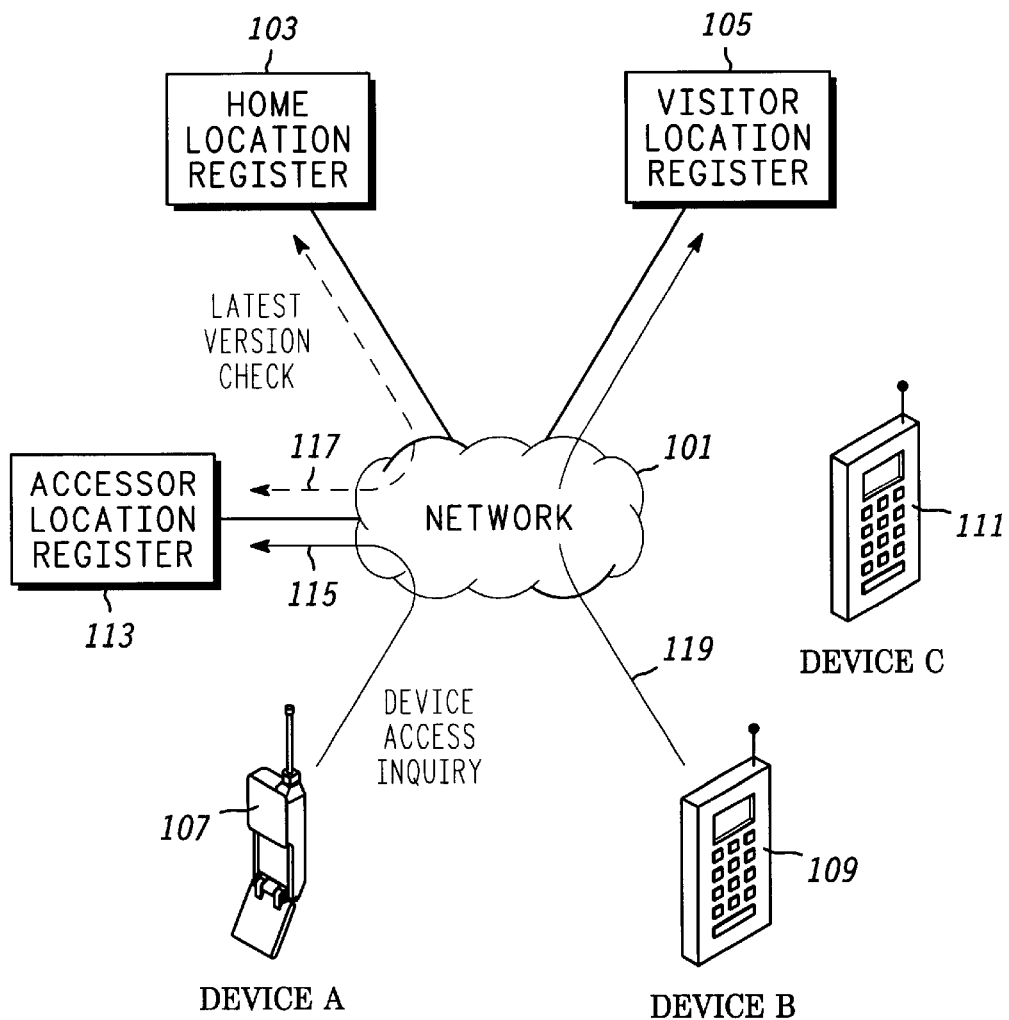
FIG. 1 depicts, in a simplified and representative form, a first embodiment of the relevant portions of a communications system in accordance with the present invention.

The present disclosure will discuss various embodiments in accordance with the invention. These embodiments include methods and registers and communications systems employing each or all of the aforesaid. The system diagram of FIG. 1 will be used to lay the groundwork for a deeper understanding of the present invention and advantages thereof. FIG. 1 in large part and at the simplified level depicted is a representative diagram of the relevant portions of a communications system 100, for example, a typical and known wireless phone system augmented with certain embodiments in accordance with the present invention, and will serve to explain the problems and certain inventive solutions thereto according to the present invention. The system 100 is a wide area network (WAN) comprised of the network 101 connecting various coverage areas or zones together. Each area will likely have a home location register (HLR) 103 (one depicted) and a visitor location register (VLR) 105 (one depicted).

The HLR will store profile information including contact, services, and billing information for communications units that normally operate within and are registered with the system represented by the HLR. These communications units represented as Device A, B, or C 107, 109, 111 are, for example, cell phones, wireless data units or suitably equipped computers or personal organizers, two way pagers or the like that may wish to communicate with each other or other entities over the network. When one of these units travels or roams beyond their respective home areas and registers with a different system the VLR for that system will be checked for relevant information concerning the roaming unit. If not found the HLR, identified from the registration information such as a phone number or system ID in many current systems or a URN or home URL in systems being planned, will be contacted and the relevant information for the unit obtained. As noted earlier the HLR will be updated to point to the VLR requesting the information and any previous VLR will be notified of the new one and the previous VLR will de-register the unit.

By way of example suppose unit or device C 111 is normally registered with HLR 103 but has traveled and is now registered with VLR 105. If communications unit or device B 109 is in the coverage area represented by the VLR and attempts to contact device C the contact information will be available in the VLR 105 and can be obtained by accessing the VLR 119 and little or minimal delay in making the contact will be incurred. However if device A wishes to contact device C represented by a URN or phone number and Device A is not located in the coverage area represented by VLR 105 it will contact the HLR for device C and that HLR will point to the VLR 105. Using a URL for VLR 105 or other identifier device A can now establish a connection or session with device C. Depending on network capacity and other connection delays significant latency in setting up the connection with device C may be experienced and significant network capacity may be used.

Figure 2:
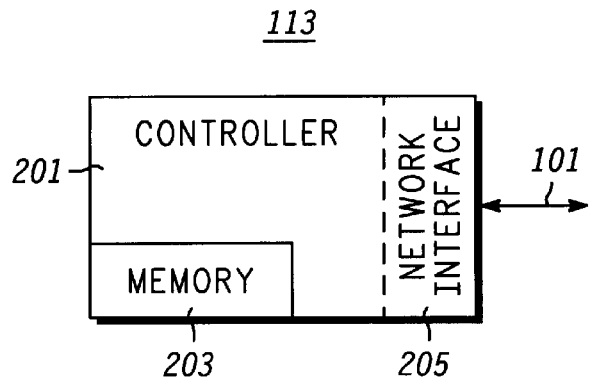
FIG. 2 depicts, in a simplified and representative form, a block diagram of accessor location register in accordance with the present invention.

In order to alleviate or ameliorate the above noted problems this disclosure introduces the concept of an accessor location register (ALR) 113 (one depicted). Unlike the HLR or VLR as classically described there can be a multiplicity of ALRs each having contact information for the same unit. Unlike the HLR, somehow representative of a home or billing location or the VLR, somehow representative of a present or serving location, the ALR is, functionally, a database that is, from a time delay perspective, proximate to an accessor or device wishing to access another through the network 101. Referring to the block diagram of FIG. 2 an ALR is essentially a controller 201. coupled to memory 203 that stores a cross-reference between URNs and URLs in a preferred embodiment. The controller 201. is coupled to the network 101 through a network interface 205. As a database accessible through the network the ALR and its constituent elements are generally known and will not be further discussed. It may be noted that the local ALR, HLR, and VLR may be one or more of the same physical servers or may be separate servers collocated or separate servers separately located. The specific operation of the ALR in assisting with obtaining contact information is an inventive aspect that will be further reviewed below.

As an overview whenever an originating unit, such as device A 107 wishes to contact a target device, such as device C 111, a local ALR 113 is accessed 115 with the target device URN. The ALR cross references this URN to find a URL for the target, such as the URL for the VLR 105 and contacts the VLR to start a session with the target device. Separately using the URN the ALR contacts the HLR to make a validity check 117 of the URL. In somewhat more detail a preferred method in accordance with the present invention is one for obtaining information required to contact a communications unit. The method includes accessing an accessor location register, containing uniform resource names (URNs) cross referenced to uniform resource locators (URLs), to determine whether a URL corresponding to a URN for the communication unit is available. When the URL is available; initiating, using the URL, a first contact attempt with the communications unit; and contacting, using the URN, a home location register to validate the URL. When the URL is not available; contacting, using the URN, the home location register to obtain the URL and then, using the URL, initiating a second contact attempt with the communications unit.

The above noted contacts or accesses of the HLR will preferably result in a response from or receiving an indication from the HLR that the URL is valid or alternatively that it is invalid. An invalid indication will preferably also include a valid URL. In either case responsive to receiving the indication the information associated with the URN and the URL within the accessor location register will be updated in the one case with the time of the valid indication and in the other the correct URL and time of the indication. These indication times will be useful in maintaining the ALRs database.

The steps of initiating the first contact attempt and the second contact attempt further includes contacting a visitor location register using the URL for information relevant to the communications unit and starting a session with the communications unit. When an indication that the URL is invalid is received the first contact attempt will not be successful and another contact attempt with the communications unit will be initiated using a second URL that is returned from the HLR with the indication and that is thus valid. This latest contact attempt will include contacting a VLR corresponding to the second and valid URL for information relevant to the communications unit and starting a session with the communications unit.

Of course the above method(s) are ordinarily initiated by a second communications unit or other entity requesting a session with the communications unit. It is worthy of note that after the method has been practiced responsive to the first request for a session the contact information within the ALR is likely to be current or valid at least for some time. Thus a further request for another session from the same unit or another unit within the jurisdiction of the same ALR will use the second URL for a contact attempt with the communications unit. Thus minimal, if any, delay is incurred in receiving valid contact information and only minimal system capacity is used in ascertaining or insuring that the information is correct.

As a preliminary step to accessing the ALR it may be preferable to access the local VLR to determine whether the URL for the communications unit is available and if not then accessing the ALR. As outlined above the ALR database will grow with each access or request for a URL corresponding to a new URN. Thus maintaining the accessor location register is expected. This maintenance is preferably by purging one or more URN and cross referenced URL from the ALR or ALR database based on, for example, one of frequency of access, time since last accessed, and number of communications units accessing a particular URN.

In a preferred apparatus form in accordance with the present invention an accessor location register used for storing and retrieving information required to contact a communications unit is defined. This accessor location register is part of a communications system infrastructure and includes as noted with reference to FIG. 2 a memory and a controller. The memory includes a database containing uniform resource names (URNs) cross-referenced to uniform resource locators (URLs). The controller, normally responsive to a request for a session with the communications unit from another communications unit operates for accessing the database and performing, in cooperation with the memory and the network interface, the other above discussed process steps.

Figure 3:
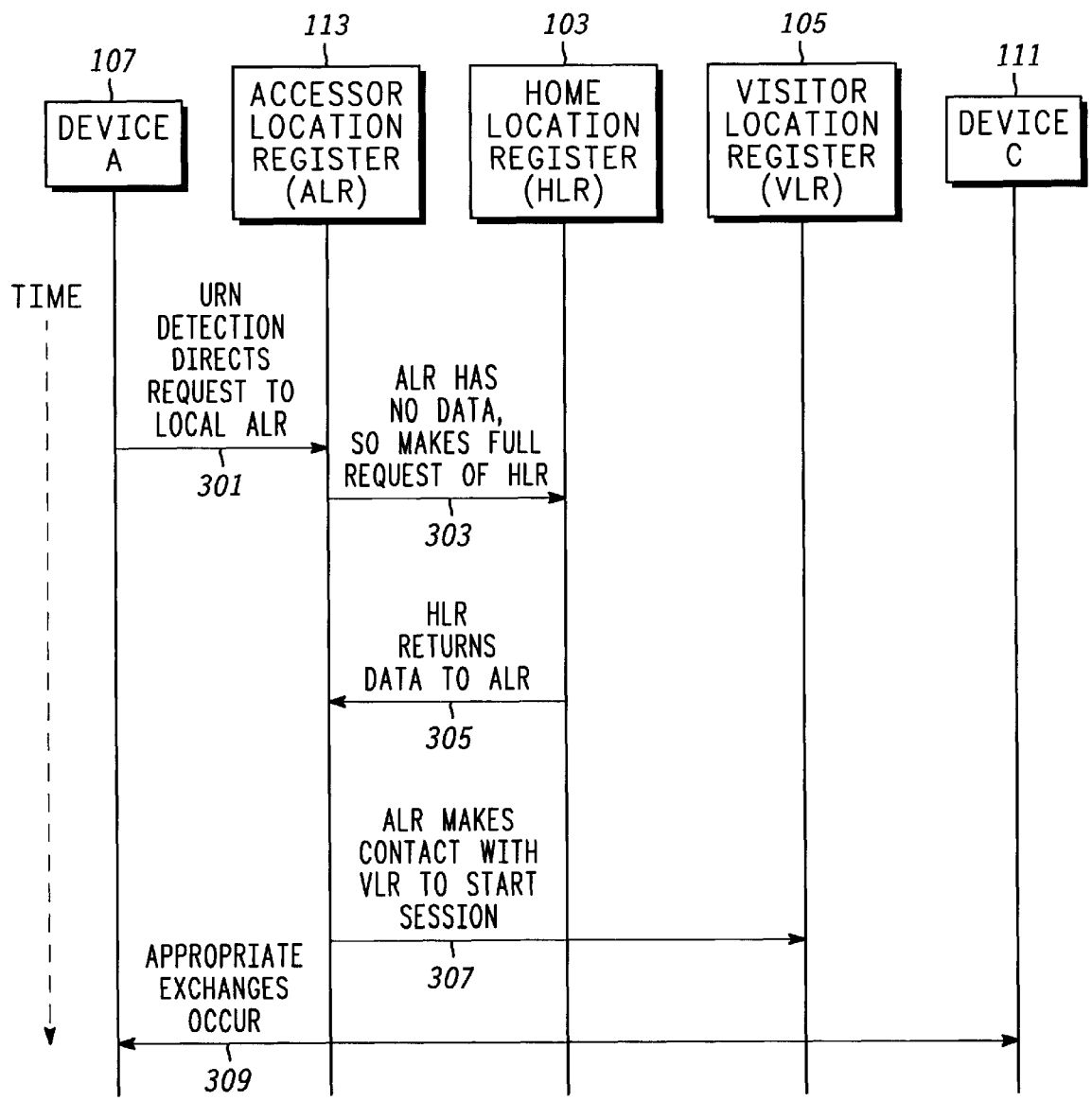
FIG. 3 through FIG. 6 depict, in a simplified and representative form, various ladder diagrams showing the operation and function of the accessor location register and communications system of FIG. 2 and FIG. 1 in accordance with the present invention.

To further illuminate the inventive concepts and principles disclosed herein an explanation of the exemplary ladder diagrams of FIG. 3 through 6 will be undertaken. FIGS. 3–6 have a number of elements in common and demonstrate various instances and circumstances of unit or device A 107 attempting to contact device C 111. They each represent various interactions, as time progresses from the top to the bottom of the diagram, between Device A 107, ALR 113, HLR 103, VLR 105, and Device C 111. Referring to FIG. 3 an example where the ALR has no data corresponding to a URN is depicted. The device A, wishing to contact device C or initiate a session with device C, transmits a device access inquiry including the URN for device C and upon detection of the URN the request for a session is directed 301 to the local (to device A) ALR 113 where the controller receives the request together with the URN. The controller of the ALR will access the memory including the database containing uniform resource names (URNs) cross referenced to uniform resource locators (URLs) to determine whether a URL corresponding to the URN for the communication unit or device C is available.

When the URL is not available or the ALR does not have any data, the controller of the ALR will contact, using the URN, the home location register (HLR) 103 to make a full request for information regarding the URN 303. The HLR returns the data to the ALR 305 and the controller thus obtains the proper URL and then, using this URL, initiates a contact attempt with the communications unit by making contact with the VLR 105 to start a session 307. Thereafter appropriate exchanges between the units occur 309.

Figure 4:
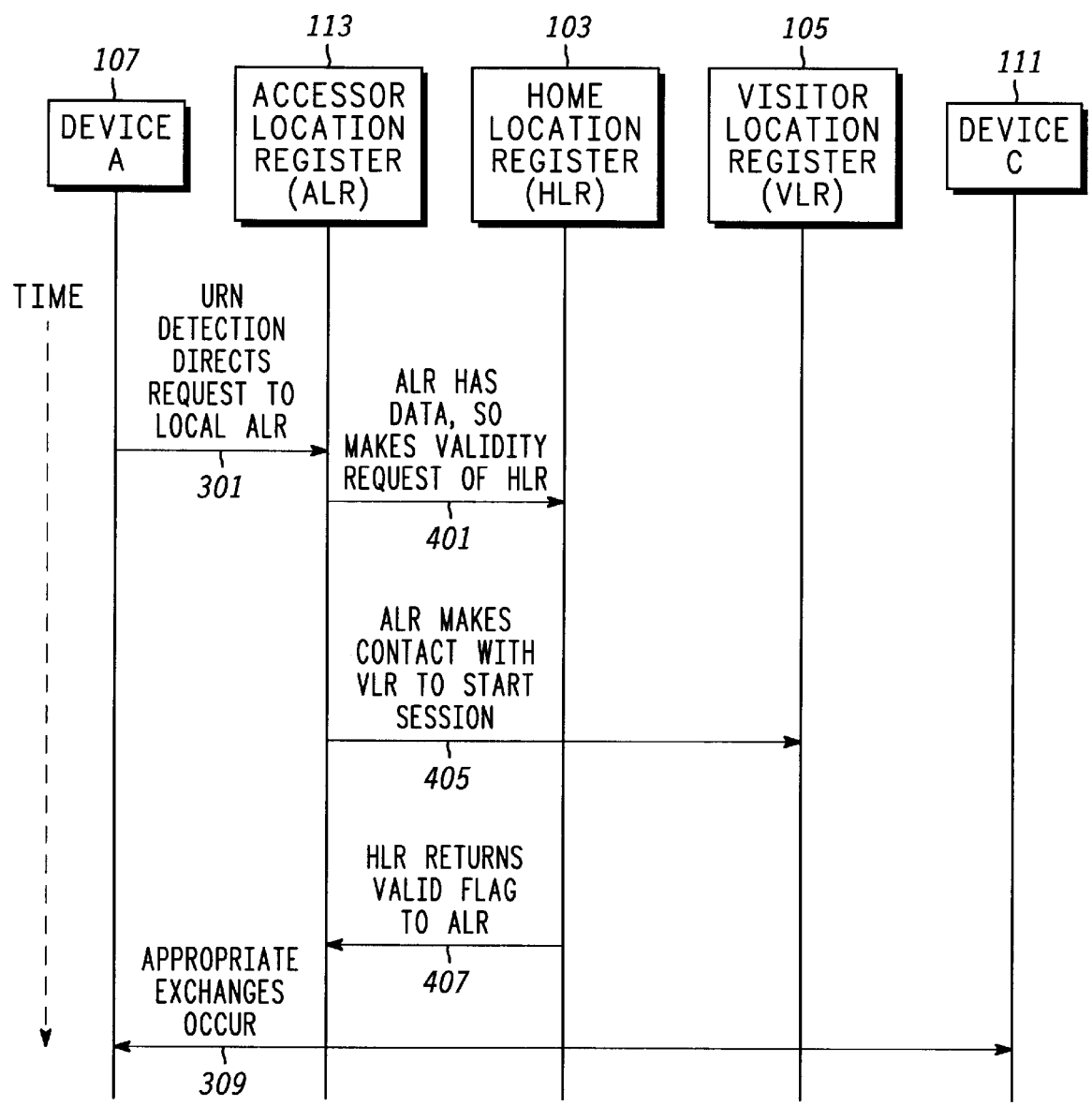

FIG. 4 represents a situation where after the request at 301 the controller of the ALR determines that the database contains information corresponding to the URN, specifically that a URL is available. Then initiation of a contact attempt with the communications unit, here device C, is undertaken, specifically the VLR represented by the URL is contacted to start a session 405 and using the URN the ALR contacts the HLR with a validity request 401 for the URL. FIG. 4 depicts the case where responsive to the validity request 401 the HLR returns an indication that the URL is valid, 407. Note this exchange is expected to include only minimal amounts of network traffic, perhaps only a version number or time stamp or hashing function or check sum indicative of the information that needs to be validated and the expected result in most cases is a mere acknowledgement. The ALR may be expected to update information, such as the time when the URL was found valid, associated with the URN and URL within the database responsive to this indication. After the contact attempt to the VLR appropriate exchanges between the device or unit A and C will occur.

Figure 5:
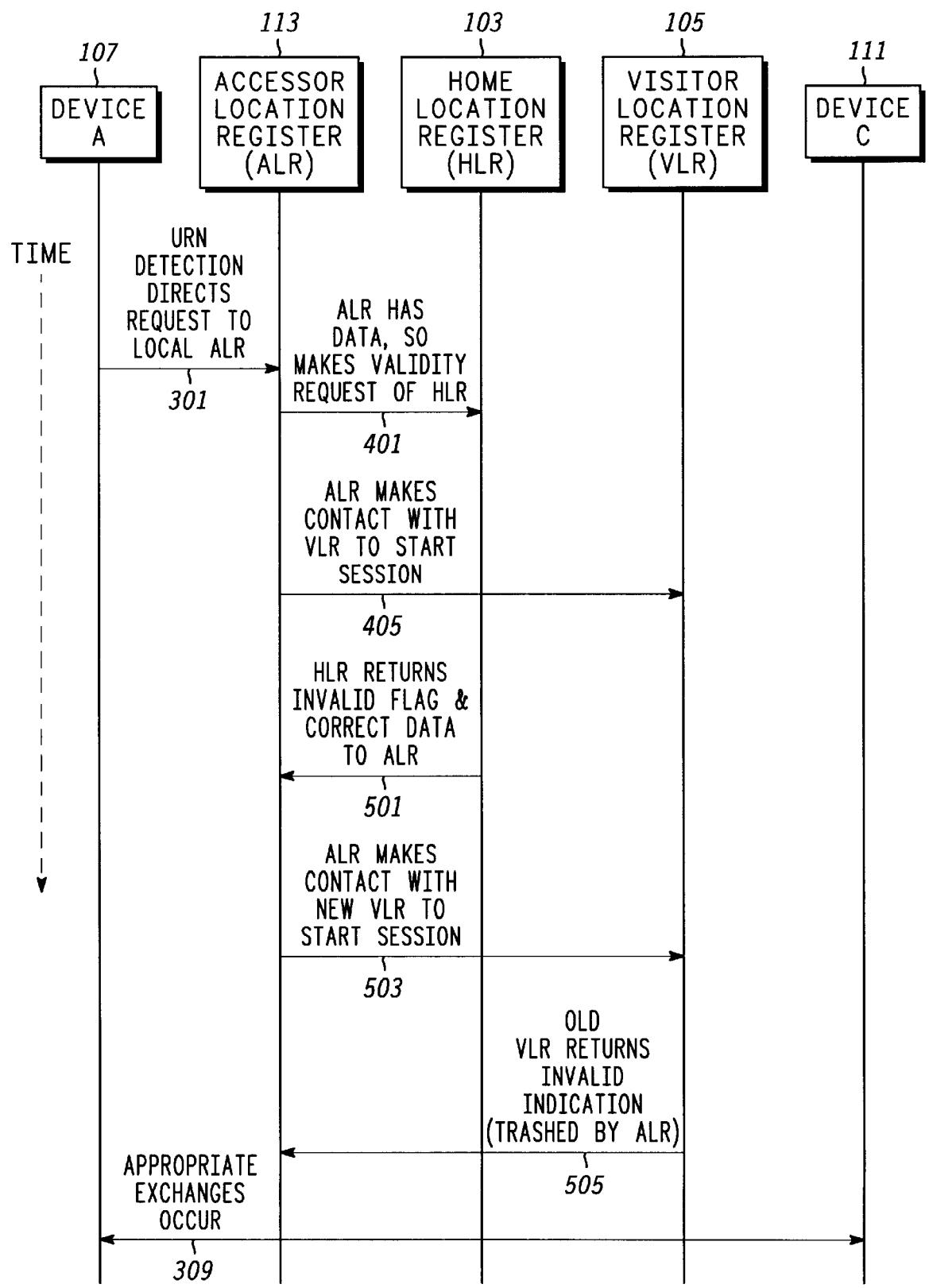

Referring to FIG. 5 the situation is depicted where the ALR has a URL associated with the URN but rather than being valid the URL is found to be invalid. In FIG. 5 the processes or transactions represented by 301, 401, and 405 as explained above occur however here the ALR, specifically controller, receives an indication or flag from the HLR that indicates that the contact information, including URL, is invalid 501. Also received is correct information including a second URL that is valid. Responsive thereto the contact attempt at 405 is abandoned and initiation, using the second URL, of another contact attempt with the new VLR corresponding to the second URL is undertaken 503 to obtain information relevant to starting or causing the new VLR to start a session with the communications unit, device C. At this point FIG. 5 depicts the old VLR corresponding to the initial but invalid URL returning an invalid indication 505, responsive to the contact attempt at 405. The ALR would be expected to ignore this indication, as it is duplicative of the indication to the same effect earlier received from the HLR 501. Thereafter exchanges occur 309. The ALR will update the information associated with the URN and URL in the database when the new valid information or URL is received.

Figure 6:
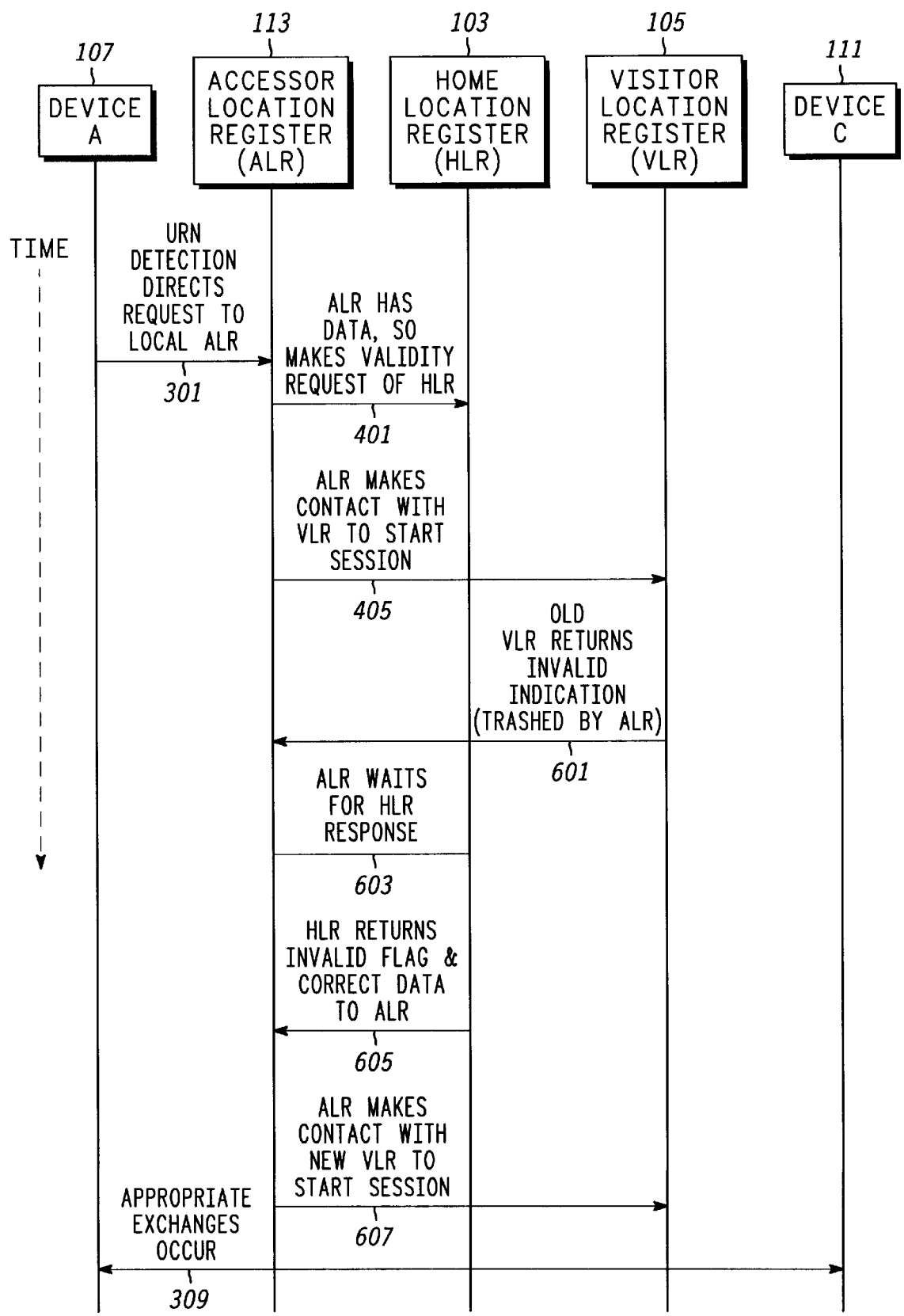

FIG. 6 depicts a situation largely duplicative of the FIG. 5 procedure vis a vis 301, 401, and 405. However in this case the old VLR returns an invalid indication that is trashed or ignored by the ALR 601, prior to the invalid response and correct data with new URL from the HLR at 605. The ALR or controller, recognizing that a response is forthcoming due to the request at 401, waits for this response 603 from the HLR. After receiving the correct data with URL a contact with the new VLR is made in order to start a session 607 with the unit, device C, and appropriate exchanges occur 309.

It is worth noting that the controller of the ALR, after processing one request for a session with the communications unit that results in validating or updating the information relevant to the URN for the unit, will use the updated information or new URL for initiating another session between the unit and the original or another unit. One alternative or change to the procedures outlined in FIGS. 3–6 that may be useful in some circumstances is for the original request for a session with the URN at 301 to be first directed to the local VLR and if not successful then to the local ALR. The utility of this procedure will depend on traffic statistics that each system operator will have to analyze for their particular circumstances. As noted above because of the nature of the ALR it is expected that the controller will have to maintain the database and from time to time purge one or more records or URNs and cross-referenced URLs. Such maintenance can be motivated by lack of memory space and rely on, for example, frequency of access, time since last accessed, or number of different communications units accessing the records associated with a given URN.

Throughout this disclosure the terms home location register or HLR and visitor location register or VLR have been used. This terminology has been associated with current cellular telephone systems, such as the known GSM system and the like. Systems such as the Internet or Internet based systems tend to use Home agent and Foreign agent to denote similar functionality. New wireless systems such as the General Packet Radio Service (GPRS) denote this or similar functionality to the Home agent as a Gateway GPRS Support Node (GGSN) and the Foreign agent as Serving GPRS Support Node (SGSN).

Whatever they are called, the HLR is a database that contains the subscriber or communications unit or device profile information for what services are available, billing information, and contact information such as an air interface identification, etc. The HLR will have the most or only reliable information as to which, if any, VLR the subscriber is now registered with. As now defined there can be only one HLR and one VLR for a given mobile device or unit. This disclosure has proposed and discussed an accessor location register ALR or database. The ALR in contrast to the HLR and VLR is primarily for the benefit of accessor or communications units who wish to access or find and communicate with other units. There is no limit on the number of ALRs that may include and provide current information for a given communications unit. The processes, discussed above, are intended to and will keep the information within the ALR updated so long as that information is useful. In the end the ALR is expected to minimize latency associated with contacting a target unit as well as reduce network traffic. In a sense the ALR can be viewed as a local cache of information to be used by accessor or originating units in order to facilitate and expedite establishing connections with target units.

Various embodiments of methods and ALRs, as used within communications systems, to facilitate and provide contact information for communications units in a timely manner have been discussed and described. It is expected that these embodiments or others in accordance with the present invention will have access to many wide area networks that provide for mobility of their user or subscriber devices or units as well as wireless local area networks that are coupled to fixed WANS such as the PSTN or internet. The disclosure extends to the constituent elements or equipment comprising such systems, ALRs and the methods employed thereby and therein. Using the inventive principles and concepts disclosed herein advantageously allows or provides for low latency and low network overhead access to contact information for target communications units or devices and procedures for maintaining such information which will be beneficial to users and providers a like. This disclosure is intended to explain how to fashion and use various embodiments in accordance with the invention rather than to limit the true and intended scope and spirit thereof. The invention is defined solely by the appended claims, as may be amended during the pendency of this application for patent, and all equivalents thereof.

What is claimed is:

1. An accessor location register used for storing and retrieving information required to contact a communications unit, the accessor location register being part of a communications system infrastructure and comprising in combination:

a memory including a database containing uniform resource names (URNs) cross referenced to uniform resource locators (URLs), and a controller for accessing said database to determine whether a URL corresponding to a URN for the communication unit is available;

when said URL is available;

initiating, using said URL, a first contact attempt with the communications unit; and contacting, using said URN, a home location register to validate said URL; and when said URL is not available;

contacting, using said URN, said home location register to obtain said URL and then, using said URL, initiating a second contact attempt with the communications unit.

2. The accessor location register of claim 1 wherein said controller contacts a visitor location register using said URL for information relevant to the communications unit in order to initiate said first contact attempt and to initiate said second contact attempt and to cause said visitor location register to start a session with the communications unit.

3. The accessor location register of claim 1 wherein said controller maintains said database by purging one or more URN and cross referenced URL from said database based on one of lack of memory space, frequency of access, time since last accessed, and number of communications units accessing said URN.

4. The accessor location register of claim 1 wherein said controller receives an indication that said URL is invalid and a second URL that is valid from said home location register and initiates, using said second URL, a third contact attempt with the communications unit.

5. The accessor location register of claim 4 herein said controller contacts a visitor location register corresponding to said second URL for information relevant to the communications unit in order to initiate said third contact attempt and to cause said visitor location register to start a session with the communications unit.

6. The accessor location register of claim 4 wherein said controller updates, responsive to receiving said indication, information associated with said URN and URL within said database.

7. The accessor location register of claim 6 wherein said controller receives a request for a session with the communications unit from a second communications unit and after updating said information receives a further request for a session with the communications unit from a further communications unit and uses said second URL to initiate a contact attempt with the communications unit.

8. The accessor location register of claim 1 wherein said controller further receives an indication that said URL is valid and, responsive thereto, updates information associated with said URN and said URL within said database.

9. The accessor location register of claim 1 wherein said controller accesses said database after receiving an indication from a local visitor location register that said URL is not available.

10. The accessor location register of claim 1 wherein said controller receives a request for a session with the communications unit from a second communications unit.

11. A method of obtaining information required to contact a communications unit, the method including the steps of:
   accessing an accessor location register, containing uniform resource names (URNs) cross referenced to uniform resource locators (URLs), to determine whether a URL corresponding to a URN for the communication unit is available;
   when said URL is available;
   initiating, using said URL, a first contact attempt with the communications unit; and contacting, using said URN, a home location register to validate said URL; and
   when said URL is not available;
   contacting, using said URN, said home location register to obtain said URL and then, using said URL, initiating a second contact attempt with the communications unit.

12. The method of claim 1 wherein said step of initiating said first contact attempt and said step of initiating said second contact attempt further includes a step of contacting a visitor location register using said URL for information relevant to the communications unit and a step of starting a session with the communications unit.

13. The method of claim 11 further including a step of maintaining the accessor location register by purging one or more URN and cross referenced URL from said accessor location register based on one of frequency of access, time since last accessed, and number of communications units accessing said URN.

14. The method of claim 1 further including a step of receiving an indication that said URL is invalid and receiving a second URL that is valid and initiating, using said second URL, a third contact attempt with the communications unit.

15. The method of claim 12 wherein said step of initiating said third contact attempt further includes a step of contacting a visitor location register corresponding to said second URL for information relevant to the communications unit and a step of starting a session with the communications unit.

16. The method of claim 12 further including a step of updating, responsive to said steps of receiving, information associated with said URN and URL within said accessor location register.

17. The method of claim 16 further including a step of receiving a request for a session with the communications unit from a second communications unit and after said step of updating said information receiving a further request for a session with the communications unit from a further communications unit and using said second URL to initiate a contact attempt with the communications unit.

18. The method of claim 1 further including a step of receiving an indication that said URL is valid and, responsive thereto, updating information associated with said URN and said URL within said accessor location register.

19. The method of claim 11 further including a step of accessing a local visitor location register to obtain said URL and when said URL is not available said step of accessing an accessor location register is performed.

20. The method of claim 11 further including a step of receiving a request for a session with the communications unit from a second communications unit.

* * * * *

UNITED STATES PATENT AND TRADEMARK OFFICE
CERTIFICATE OF CORRECTION

PATENT NO. : 6,487,407 B2
DATED : November 26, 2002
INVENTOR(S) : Goldberg, Steven J. et al.

It is certified that error appears in the above-identified patent and that said Letters Patent is hereby corrected as shown below:

<u>Column 8,</u>
Line 54, change "herein" to -- wherein --

Signed and Sealed this

Fourth Day of March, 2003

JAMES E. ROGAN
*Director of the United States Patent and Trademark Office*